US012798400B2

(12) United States Patent
Iwata et al.

(10) Patent No.: US 12,798,400 B2
(45) Date of Patent: Nov. 17, 2026

(54) BATTERY MANAGEMENT SYSTEM AND BATTERY MANAGEMENT METHOD

(71) Applicant: HONDA MOTOR CO., LTD., Tokyo (JP)

(72) Inventors: Kazuyuki Iwata, Wako (JP); Hiroyuki Kanazawa, Wako (JP); Akihiro Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 18/843,547

(22) PCT Filed: Mar. 11, 2022

(86) PCT No.: PCT/JP2022/010927

§ 371 (c)(1),
(2) Date: Sep. 3, 2024

(87) PCT Pub. No.: WO2023/170932

PCT Pub. Date: Sep. 14, 2023

(65) Prior Publication Data

US 2025/0187452 A1 Jun. 12, 2025

(51) Int. Cl.

*B60L 50/60* (2019.01)
*B60L 53/66* (2019.01)

(Continued)

(52) U.S. Cl.

CPC ............. *B60L 50/60* (2019.02); *B60L 53/665* (2019.02); *B60L 55/00* (2019.02); *H02J 3/322* (2020.01); *H02J 3/381* (2013.01); *H02J 2101/24* (2026.01)

(58) Field of Classification Search

CPC ................................ B60L 50/60; B60L 55/00

(Continued)

(56) References Cited

U.S. PATENT DOCUMENTS

2011/0025267 A1* 2/2011 Kamen ................. B60L 53/305 320/109
2019/0111805 A1 4/2019 Hidaka (Continued)

FOREIGN PATENT DOCUMENTS

EP 3444760 A1 * 2/2019 ............. G06Q 10/20
JP 2008-141926 A 6/2008

(Continued)

OTHER PUBLICATIONS

English translation of the International Preliminary Report on Patentability dated Sep. 26, 2024 issued in corresponding International application No. PCT/JP2022/010927 (5 pages).

(Continued)

*Primary Examiner* — Daniel Kessie
*Assistant Examiner* — Dru M Parries
(74) *Attorney, Agent, or Firm* — Rankin, Hill & Clark LLP

(57) ABSTRACT

A battery management system includes: a battery capacity division section that virtually divides a capacity of a battery mounted on a mobile object into a first area and a second area, and makes the battery available to a first user within the first area and makes the battery available to a second user within the second area; a desired use condition recognition section that receives, via a communication unit, desired use condition information presenting a desired condition for use of the battery within the second area and recognizes the desired condition for use, the desired use condition information being transmitted from a prospective user terminal used by a prospective user of the battery; and a battery user selection section that, when the desired condition for use satisfies a predetermined condition for selection, selects, as the second user, the prospective user of the battery present- (Continued)

ing the desired condition for use that satisfies the condition for selection.

3 Claims, 5 Drawing Sheets

(51) Int. Cl.

| | |
|---|---|
| ***B60L 55/00*** | (2019.01) |
| ***H02J 3/32*** | (2006.01) |
| ***H02J 3/38*** | (2006.01) |
| *H02J 101/24* | (2026.01) |

(58) Field of Classification Search
USPC .......................................................... 307/9.1
See application file for complete search history.

(56) References Cited

U.S. PATENT DOCUMENTS

| | | | | |
|---|---|---|---|---|
| 2019/0202292 | A1* | 7/2019 | Katanoda | B60L 53/18 |
| 2020/0101850 | A1 | 4/2020 | Harty et al. | |
| 2020/0247265 | A1 | 8/2020 | Vidhi et al. | |
| 2021/0050726 | A1 | 2/2021 | Kitaji | |
| 2021/0331599 | A1 | 10/2021 | Hishida et al. | |

FOREIGN PATENT DOCUMENTS

| | | | |
|---|---|---|---|
| WO | 2011/161758 | A1 | 12/2011 |
| WO | 2017/170741 | A1 | 10/2017 |
| WO | 2019/150814 | A1 | 8/2019 |
| WO | 2020/148850 | A1 | 7/2020 |

OTHER PUBLICATIONS

International Search Report and Written Opinion from Corresponding International Application No. PCT/JP2022/010927, dated Apr. 26, 2022, 7 pages.
European Search Report Corresponding to EP Application No. 22930913.3, dated Apr. 2, 2025, 12 pages.
European Office Action dated Jan. 13, 2026, Application No. 22 930 913.3; 10 pages.

* cited by examiner

FIG.3

| ELECTRICITY PROVIDER ID | DESIRED PERIOD OF USE | DESIRED RENTAL FEE | DESIRED CAPACITY | ··· |
|---|---|---|---|---|
| EpID-1 | Dpd-1 | Drc-1 | Dcp-1 | ··· |
| EpID-2 | Dpd-2 | Drc-2 | Dcp-2 | ··· |
| EpID-3 | Dpd-3 | Drc-3 | Dcp-3 | ··· |
| : | : | : | : | : |

BATTERY MANAGEMENT SYSTEM AND BATTERY MANAGEMENT METHOD

TECHNICAL FIELD

The present invention relates to a battery management system and a battery management method.

BACKGROUND ART

Conventionally, there has been proposed a device that manages the capacity of a battery mounted on an electric vehicle by virtually dividing the capacity thereof into a first area provided for electricity transmission and reception to/from an electricity facility connected to an electricity grid, and a second area used by a vehicle user, and that displays a remaining amount in the second area on a meter of the vehicle (for example, see Patent Literature 1).

Citation List

Patent Literature

[Patent Literature 1]
International Publication No. WO 2020/148850

SUMMARY OF INVENTION

Technical Problem

In the above-described conventional technology, the vehicle user and another user other than the vehicle user that use the virtually divided capacity of the battery are fixed, and selection of another user is not mentioned. Accordingly, there has been scope for improvement to more effectively use a battery included in a mobile object such as an electric vehicle by appropriately selecting another user.

The present invention has been made in view of such background, and an object thereof is to provide a battery management system and a battery management method that can support more effective use of a battery mounted on a mobile object.

Solution to Problem

A first aspect to achieve the object is a battery management system including: a battery capacity division section that makes a battery mounted on a mobile object available to a first user within a first area and makes the battery available to a second user other than the first user within a second area, by virtually dividing a capacity of the battery into the first area and the second area, and allocating the first area to the first user and allocating the second area to the second user, the first user being a user of the mobile object; a communication unit that performs communication with a communication terminal; a desired use condition recognition section that receives, via the communication unit, desired use condition information presenting a desired condition for use of the battery within the second area and recognizes the desired condition for use, the desired use condition information being transmitted from a prospective user terminal used by a prospective user of the battery who desires to use the battery within the second area; and a battery user selection section that, when the desired condition for use recognized by the desired use condition recognition section satisfies a predetermined condition for selection, selects, as the second user, the prospective user of the battery presenting the desired condition for use that satisfies the condition for selection.

The battery management system may be configured such that a condition that the desired condition for use includes payment of a consideration of a predetermined amount or more for use of the battery within the second area is set as the condition for selection.

The battery management system may be configured such that a condition that when the desired use condition recognition section recognizes a plurality of the desired conditions for use that include an amount of a consideration to be paid for use of the battery within the second area, the desired condition for use includes the highest amount to be paid is set as the condition for selection.

The battery management system may be configured such that a condition that the desired condition for use includes a desired period of use of the battery within the second area, the desired period of use being a first predetermined period or more, is set as the condition for selection.

The battery management system may be configured such that a condition that when the desired use condition recognition section recognizes a plurality of the desired conditions for use that include a desired period of use of the battery within the second area, the desired condition for use includes the longest desired period of use is set as the condition for selection.

The battery management system may be configured such that a condition that after use of the mobile object by the first user is started, when the desired use condition recognition section recognizes the desired condition for use presenting a desired capacity of the second area that necessitates a decrease in the capacity of the first area, the battery user selection section transmits, via the communication unit, capacity decrease confirmation information to a first user terminal used by the first user and receives, via the communication unit, capacity decrease approval information transmitted from the first user terminal in response to reception of the capacity decrease confirmation information is set as the condition for selection, the capacity decrease confirmation information inquiring whether or not to approve a decrease in the capacity of the first area, the capacity decrease approval information indicating approval of the decrease in the capacity of the first area.

The battery management system may be configured to include a selection condition relaxation section that relaxes the condition for selection when the desired condition for use that satisfies the condition for selection is not recognized by the desired use condition recognition section.

A second aspect to achieve the object is a battery management method that is executed by a computer having a communication unit that performs communication with a communication terminal, the battery management method including: a battery capacity division step of making a battery mounted on a mobile object available to a first user within a first area and making the battery available to a second user other than the first user within a second area, by virtually dividing a capacity of the battery into the first area and the second area, and by allocating the first area to the first user and allocating the second area to the second user, the first user being a user of the mobile object; a desired use condition recognition step of receiving, via the communication unit, desired use condition information presenting a desired condition for use of the battery within the second area, and recognizing the desired condition for use, the desired use condition information being transmitted from a prospective user terminal used by a prospective user of the battery who desires to use the battery within the second area; and a battery user selection step of, when the desired condition for use recognized in the desired use condition recognition step satisfies a predetermined condition for selection, selecting, as the second user, the prospective user of the battery presenting the desired condition for use.

Advantageous Effect of Invention

According to the battery management system, it is possible to support more effective use of a battery mounted on a mobile object.

BRIEF DESCRIPTION OF DRAWINGS

FIG. 3 is an explanatory diagram of electricity provider data.

DESCRIPTION OF EMBODIMENTS

1. Aspect of Managing Battery of Vehicle by Battery Management System

Figure 1:
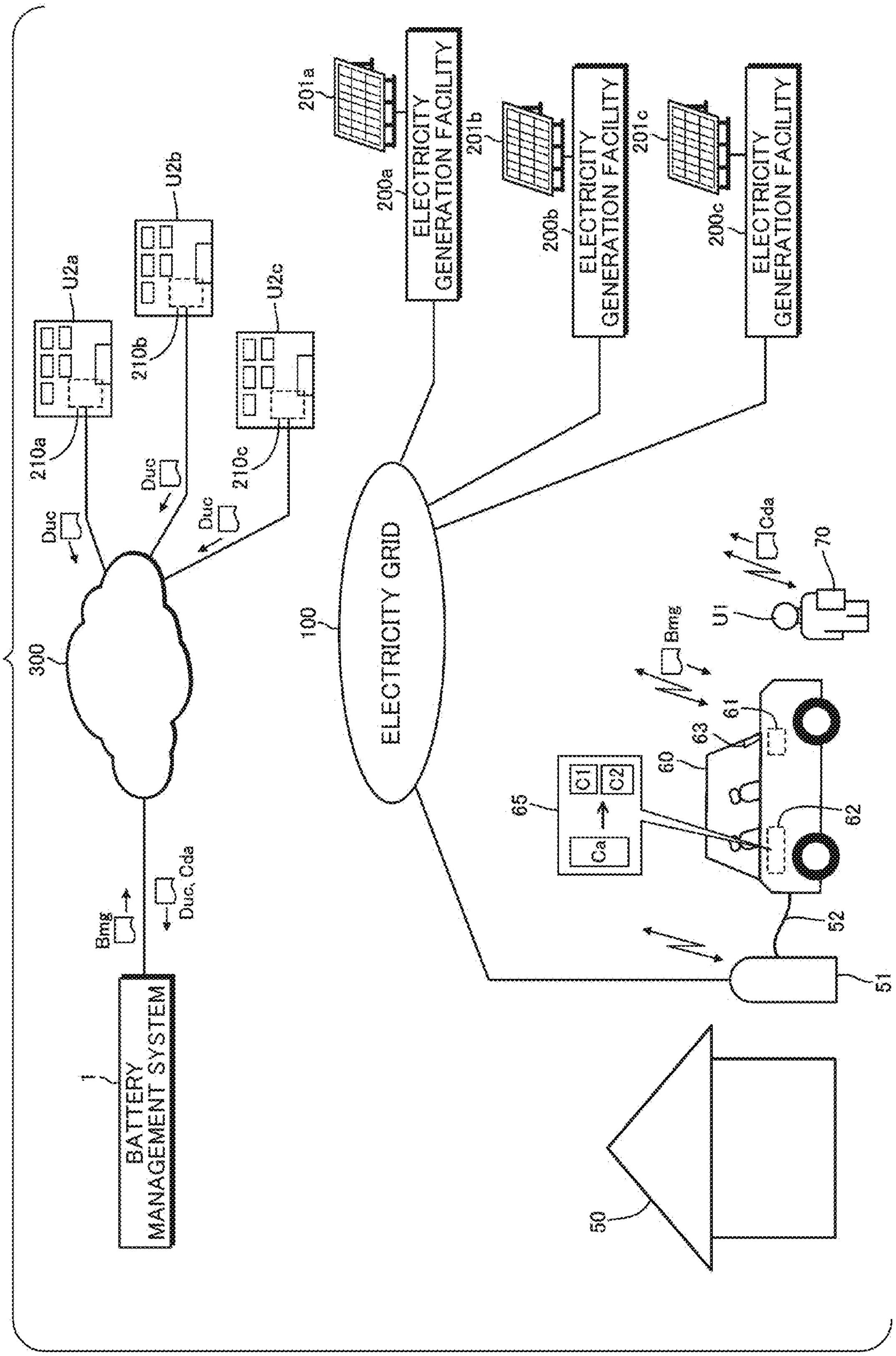
FIG. 1 is an explanatory diagram of an aspect of managing a battery of a vehicle by a battery management system.

With reference to FIG. 1, an aspect of managing a battery 62 of a vehicle 60 by a battery management system 1 in the present embodiment is described. The battery management system 1 virtually divides a capacity Ca of the battery 62 mounted on the vehicle 60 into a first area C1 and a second area C2 as shown at callout 65, and allocates the first area C1 to a vehicle user U1 and the second area C2 to any one of a plurality of electricity providers U2.

Thus, the battery management system 1 makes the battery 62 available to the vehicle user U1 within the first area C1, makes the battery 62 available to an electricity provider U2 within the second area C2, and thereby supporting more effective use of the battery 62. In FIG. 1, for the electricity providers U2, electricity providers U2*a*, U2*b*, U2*c* are illustrated. The vehicle 60 corresponds to a mobile object in the present disclosure, the vehicle user U1 corresponds to a first user in the present disclosure, and each electricity provider U2 corresponds to a second user and a prospective user in the present disclosure. Note that the capacity of the battery 62 may be divided into three or more areas, one of which may be allocated to the vehicle user U1, and the others of which may be allocated to a plurality of the electricity providers U2.

The vehicle 60 is an electric vehicle (battery electric vehicle, plug-in hybrid electric vehicle, or the like) that uses the battery 62 for a drive source, and is connected to charge-discharge equipment 51 attached to property 50, such as a home of the vehicle user U1, through a charge-discharge cable 52. The battery 62 is charged with electricity supplied from the charge-discharge equipment 51, and supplies electricity to the charge-discharge equipment 51, via the charge-discharge cable 52.

The charge-discharge equipment 51 is connected to a plurality of electricity generation facilities 200 (200*a* to 200*c*) operated by the electricity providers U2 via an electricity grid 100, and generated electricity is supplied from the electricity generation facilities 200 to the electricity grid 100. The battery 62 is charged with surplus generated electricity via the charge-discharge equipment 51, and when generated electricity supplied to the electricity grid 100 is in short supply, discharged electricity from the battery 62 is supplied to the electricity grid 100. The electricity generation facilities 200 generate electricity by using solar panels 201 (201*a* to 201*c*). The electricity generation facility 200*a* is operated by the electricity provider U2*a*, the electricity generation facility 200*b* is operated by the electricity provider U2*b*, and the electricity generation facility 200*c* is operated by the electricity provider U2*c*.

The battery management system 1 performs communication, via a communication network 300, with a vehicle control device 61, the charge-discharge equipment 51, a communication terminal 70 used by the vehicle user U1, a management system 210 of each electricity provider U2, and the like. The communication terminal 70 is a smartphone, a mobile phone, a tablet terminal, a notebook personal computer, a desktop personal computer, on-vehicle communication equipment including a car navigation system, or the like. The communication terminal 70 corresponds to a first user terminal in the present disclosure. Each management system 210 includes functionality of a prospective user terminal in the present disclosure.

The battery management system 1 transmits, to the vehicle control device 61, battery management information Bmg instructing that a ratio of the first area C1 to the second area C2 of the battery 62 be set (a capacity of each area be set), and designating an electricity provider allocated to the second area C2. Based on the battery management information Bmg, the vehicle control device 61 performs control of the capacity of the battery 62 in such a manner as to allocate the first area C1 for use by the vehicle user U1 (for discharge or regenerative charge accompanying electricity consumption by the vehicle 60, and charge from the charge-discharge equipment 51 based on an operation by the vehicle user U1), and allocate the second area C2 for use by the designated electricity provider U2 (for charge as a buffer against electricity generated by the electricity generation facilities 200, and discharge to supply electricity to the electricity grid 100).

The battery management system 1 receives desired use condition information Duc transmitted from the management system 210 of each electricity provider U2 and recognizes a desired condition for use, presented by each electricity provider U2, of the second area C2 of the battery 62. The battery management system 1 selects an electricity provider U2 presenting a desired condition for use that satisfies a predetermined condition for selection, as a user to be allocated to the second area C2 (to be allowed to use the second area through rental).

When a desired condition for use requires an increase in the capacity of the second area C2, the battery management system 1 transmits, to the communication terminal 70, capacity decrease confirmation information inquiring whether or not to approve of a decrease in the capacity of the first area C1. When capacity decrease approval information Cda approving of the decrease in the capacity of the first area C1 is received, the battery management system 1 determines that the desired condition for use satisfies the condition for selection.

Note that although one vehicle 60 and one vehicle user U1 are depicted in FIG. 1 for explanatory convenience, the battery management system 1 performs similar adjustment processes for a plurality of vehicle users and a plurality of electricity providers, with regard to divisional use of batteries mounted on a plurality of vehicles.

2. Configuration of Battery Management System

Figure 2:
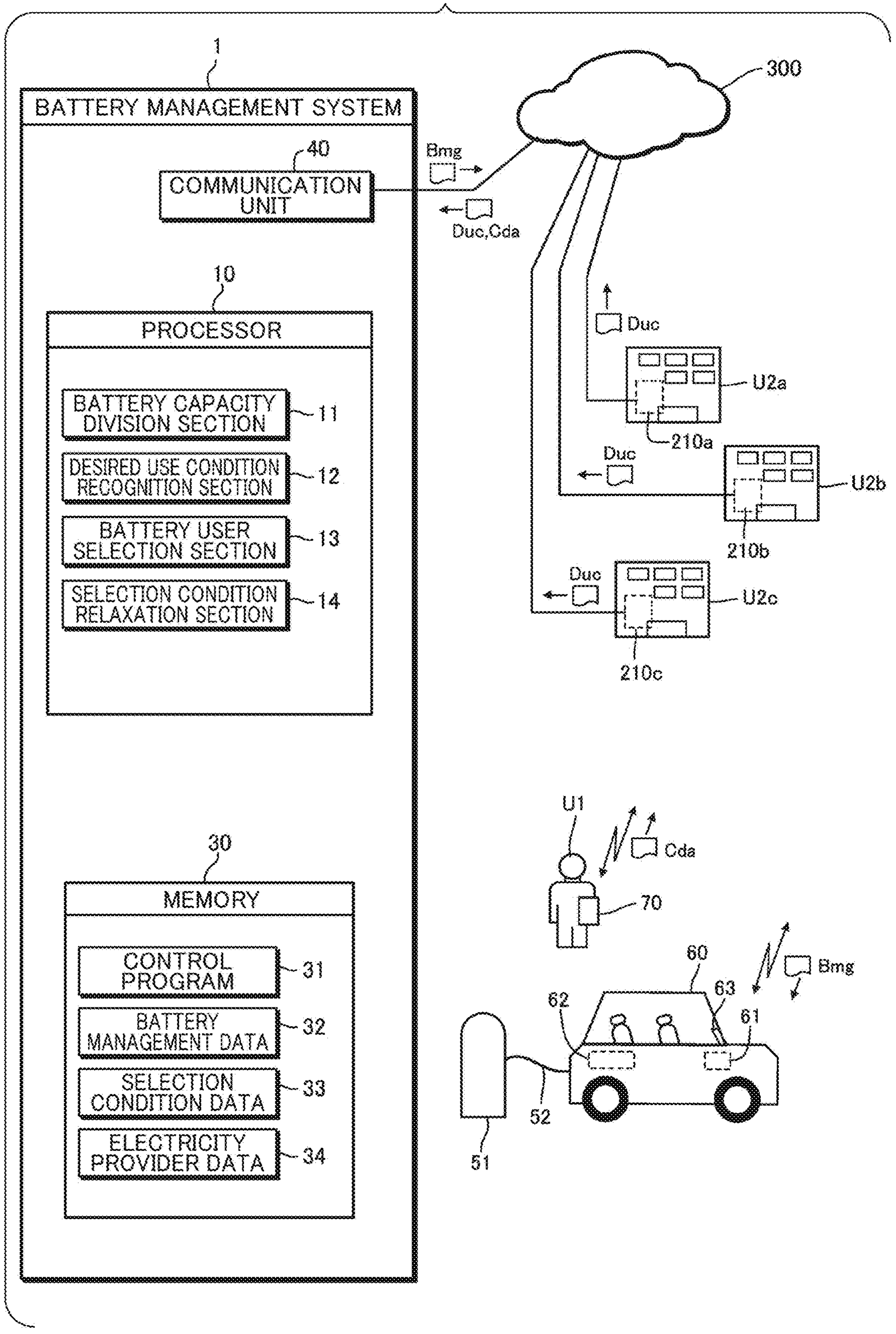
FIG. 2 is a block diagram of the battery management system.
Figure 4:
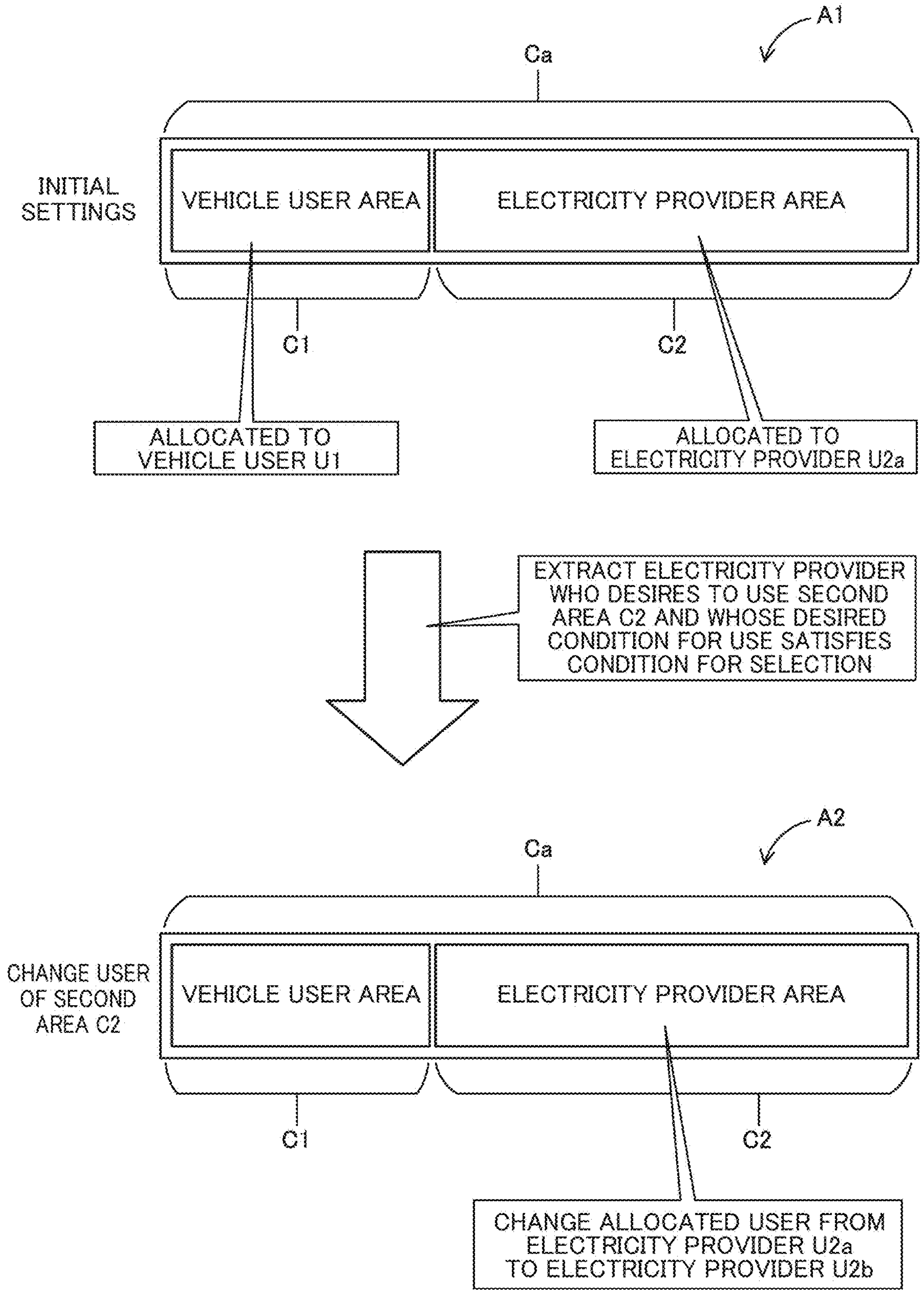
FIG. 4 is an explanatory diagram of an aspect of selecting a user of a second area of the battery.

With reference to FIGS. 2 to 4, a configuration of the battery management system 1 is described. With reference to FIG. 2, the battery management system 1 is a computer system including a processor 10, a memory 30, a communication unit 40, and the like. The communication unit 40 performs communication, via the communication network 300, with the vehicle control device 61, the communication terminal 70 used by the vehicle user U1, the management systems 210 (210*a* to 210*c*) of the electricity providers U2 (U2*a* to U2*c*), and the like.

The memory 30 stores: a control program 31 for the battery management system 1; battery management data 32 indicating a setting for a dividing ratio of the first area C1 to the second area C2 of the battery 62 (a setting of a capacity of each area) and an electricity provider that uses the second area C2; selection condition data 33 indicating the condition for selection of a user of the second area C2; and electricity provider data 34 indicating a condition for use of the second area C2 presented by each electricity provider U2.

The processor 10 reads and executes the control program 31 to function as a battery capacity division section 11, a desired use condition recognition section 12, a battery user selection section 13, and a selection condition relaxation section 14. A process executed by the battery capacity division section 11 corresponds to a battery capacity division step of a battery management method in the present disclosure, and a process executed by the desired use condition recognition section 12 corresponds to a desired use condition recognition step of the battery management method in the present disclosure. A process executed by the battery user selection section 13 corresponds to a battery user selection step of the battery management method in the present disclosure, and a process executed by the selection condition relaxation section 14 corresponds to a selection condition relaxation step of the battery management method in the present disclosure.

The battery capacity division section 11, as described above, virtually divides the capacity Ca of the battery 62 mounted on the vehicle 60 into the first area C1, which is allocated to the vehicle user U1, and the second area C2, which is allocated to an electricity provider U2, and stores, in the memory 30, the battery management data 32 indicating a dividing ratio and the electricity provider U2 allocated to the second area C2. The battery capacity division section 11 transmits, to the vehicle control device 61, battery management information Bmg instructing, based on the battery management data 32, that the battery 62 divided into the first area C1 and the second area C2 be used.

The desired use condition recognition section 12 receives desired use condition information Duc indicating a desired condition for use of the second area C2 of the battery 62, which is transmitted from the management system 210 of each electricity provider U2, recognizes the desired condition for use of the second area C2 presented by each electricity provider U2, and records data on the desired conditions for use in the electricity provider data 34.

As shown in FIG. 3, for each electricity provider U2, desired conditions for use of the second area C2 associated with an electricity provider ID are recorded in the electricity provider data 34. The desired conditions for use of the second area C2 include a desired period of use, a desired rental fee (a consideration to be paid for use of the second area C2 through rental), a desired capacity, and the like.

The battery user selection section 13 selects, from among the plurality of electricity providers U2 (prospective users of the second area C2), an electricity provider U2 presenting a desired condition for use that satisfies the condition for selection. For the condition for selection, for example, first to fifth conditions for selection as follows are set.

The first condition for selection: The desired rental fee is a predetermined amount or more.

The second condition for selection: Presents the highest desired rental fee, among the plurality of electricity providers.

The third condition for selection: The desired period of use is a predetermined period or more.

The fourth condition for selection: Presents the longest desired period of use, among the plurality of electricity providers U2.

The fifth condition for selection: The fifth condition for selection is a condition for selection in a case where, after use of the vehicle 60 by the vehicle user U1 is started, the desired use condition recognition section 12 recognizes a desired condition for use presenting a desired capacity that necessitates a decrease in the capacity of the first area C1. In such a case, the battery user selection section 13 transmits capacity decrease confirmation information inquiring whether or not to approve of a decrease in the capacity of the first area C1 to the communication terminal 70 of the vehicle user U1 via the communication unit 40. When capacity decrease approval information Cda approving of the decrease in the capacity of the first area C1, which is transmitted from the communication terminal 70 in response to reception of the capacity decrease confirmation information, is received via the communication unit 40, the battery user selection section 13 determines that the desired condition for use satisfies the condition for selection.

Examples of a timing when the battery user selection section 13 allocates an electricity provider U2 to be allocated to the second area C2 of the battery 62 include: at the time when the vehicle user U1 purchases the vehicle 60; after the vehicle user U1 has started to use the vehicle 60; at the time when a rental period for the allocated electricity provider U2 expires; a predetermined time of review (every one year or the like after the purchase of the vehicle 60); and the like.

In FIG. 4, A1 shows an example in which when the vehicle user U1 purchases the vehicle 60, the electricity provider U2*a* is selected by the battery user selection section 13, and as an initial setting, the electricity provider U2*a* is allocated as the user of the second area C2 by the battery capacity division section 11. A2 shows an example in which at a timing of selection of an electricity provider U2 after the use of the vehicle 60 by the vehicle user U1 is started, the electricity provider U2*b* is selected by the battery user selection section 13 as an electricity provider U2 presenting a desired condition for use that satisfies a condition for selection.

Based on the selection by the battery user selection section 13, the battery capacity division section 11 changes the electricity provider U2 allocated to the second area C2 of the battery 62 from the electricity provider U2*a* to the electricity provider U2*b*.

When no desired condition for use that satisfies any condition for selection is recognized by the desired use condition recognition section 12, the selection condition relaxation section 14 relaxes a condition for selection. As the relaxation of a condition for selection, for example, the selection condition relaxation section 14 performs reducing the predetermined amount in the first condition for selection, and reducing the predetermined period in the third condition for selection, or the like.

3. Process of Selecting Electricity Provider

A process of selecting an electricity provider, which is executed by the battery management system 1 in the situation shown in FIGS. 1 and 2, is described with reference to a flowchart shown in FIG. 5.

Figure 5:
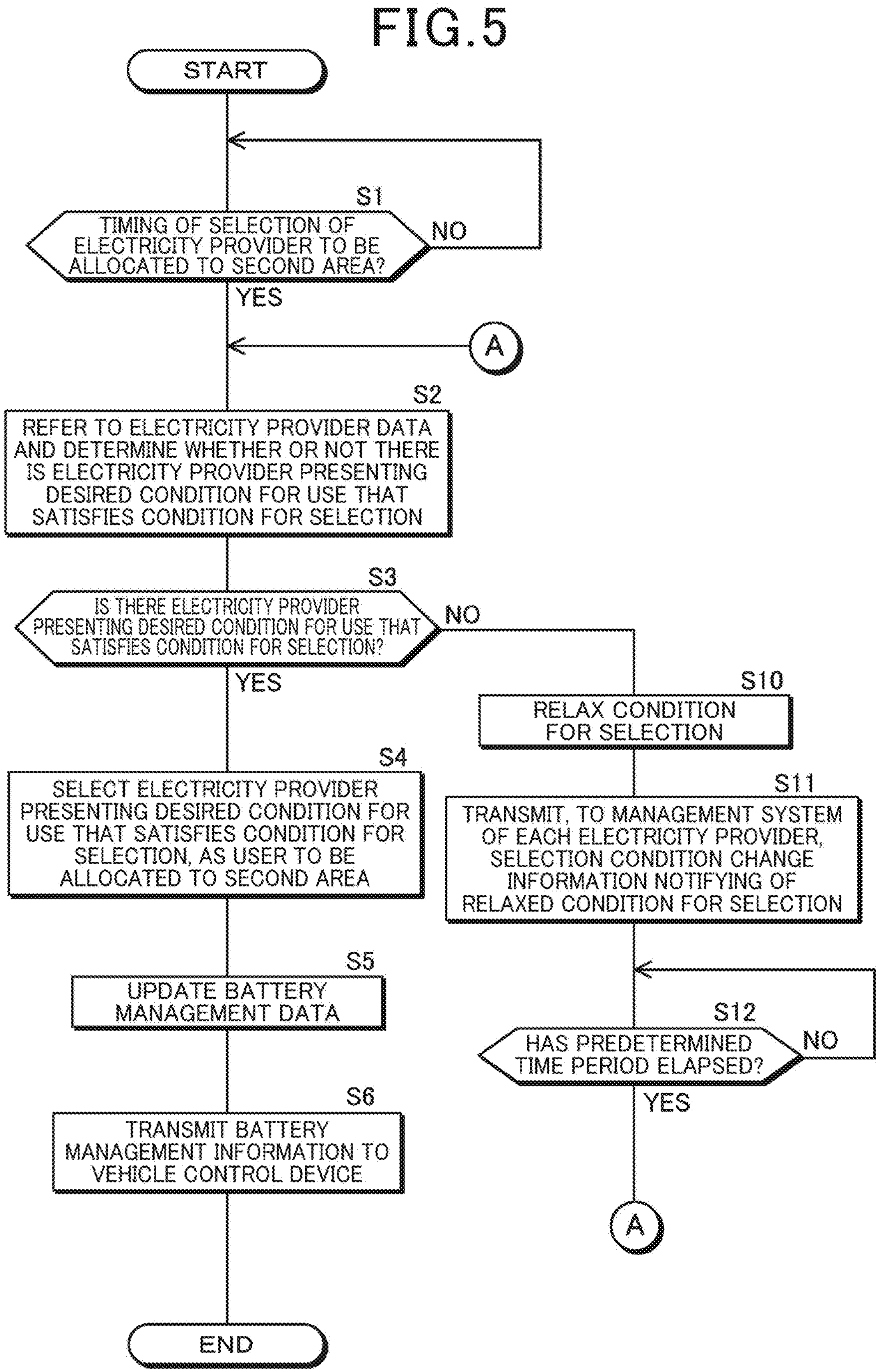
FIG. 5 is a flowchart of a process of selecting an electricity provider to be allocated to the second area of the battery.

In step S1 in FIG. 5, when it is a timing of selection of an electricity provider U2 to be allocated to the second area C2 of the battery 62, the battery user selection section 13 moves the process to step S2. As described above, the timing of selection is at the time when the vehicle user U1 purchases the vehicle 60, after the vehicle user U1 has started to use the vehicle 60, at the time when a rental period for an electricity provider U2 allocated to the second area C2 expires, a time of review of the electricity provider U2, or the like.

In step S2, the battery user selection section 13 refers to the electricity provider data 34 to determine whether or not there is an electricity provider presenting a desired condition for use that satisfies any of the conditions for selection. In subsequent step S3, the battery user selection section 13 moves the process to step S4 when there is an electricity provider U2 presenting a desired condition for use that satisfies any of the conditions for selection, and moves the process to step S10 when there is no electricity provider U2 presenting a desired condition for use that satisfies any of the conditions for selection.

In step S4, the battery user selection section 13 selects the electricity provider U2 presenting the desired condition for use that satisfies any of the conditions for selection, as a user to be allocated to the second area C2. In subsequent step S5, the battery capacity division section 11 sets the electricity provider U2 selected by the battery user selection section 13 as the new user allocated to the second area C2 and updates the battery management data 32.

In subsequent step S6, the battery capacity division section 11 transmits, to the vehicle control device 61, battery management information Bmg indicating a ratio of the first area C1 to the second area C2 of the battery 62, as well as the new electricity provider U2 allocated to the second area C2, based on the updated battery management data. Thus, the vehicle control device 61 having received the battery management information Bmg performs charge and discharge control of the battery 62 of the vehicle 60, with regard to the ratio of the first area C1 to the second area C2 and the electricity provider U2 after the update.

In step S10, the selection condition relaxation section 14 relaxes any of the conditions for selection as described above. In subsequent step S11, the selection condition relaxation section 14 transmits, to the management system 210 of each electricity provider U2, selection condition change information notifying of the relaxed condition for selection. In subsequent step S12, after a predetermined time period has elapsed, the selection condition relaxation section 14 moves the process to step S2. Thus, the processes in and after step S2 are executed again, based on the relaxed condition for selection.

4. Other Embodiments

Although the embodiment illustrates the vehicle 60 as a mobile object in the present disclosure, the mobile object in the present disclosure may be any mobile object that includes a battery that is charged and discharged by charge-discharge equipment, and may be an aircraft, a watercraft, or the like.

In the embodiment, the selection condition relaxation section 14 is included, and the processes to relax any of the conditions for selection of an electricity provider to be allocated to the second area C2 of the battery 62 are performed. However, a configuration of the embodiment may be made that omits the selection condition relaxation section 14.

In the embodiment, the battery management system 1 in the present disclosure is constituted by a computer system that performs communication with the vehicle 60 on which the battery 62 is mounted. As another embodiment, the battery management system may be configured as a function of the vehicle control device 61. In such a case, a configuration of another embodiment is made such that communication is performed between the vehicle control device 61 and each of the communication terminal 70 of the vehicle user U1 and the management systems 210 of the electricity providers U2.

In the embodiment, as a condition for selection of an electricity provider U2, it may be set that an electricity provider U2 to use the second area C2 of the battery 62 is selected according to an instruction from the vehicle user U1. For example, in FIG. 1, when selection of the electricity provider U2*a* as an electricity provider U2 to use the second area C2 of the battery 62 brings the vehicle user U1 a benefit, such as a discount to a unit price of electricity that is supplied from the electricity generation facility 200*a* to the charge-discharge equipment 51 to charge the battery 62, the vehicle user U1 can select the electricity provider U2*a* in order to enjoy the benefit.

Note that, for ease of understanding of the invention of the present application, FIG. 2 is a schematic diagram showing functional components of the battery management system 1 that is segmented based on main processes, and components of the battery management system 1 may be configured based on other categories. A process by each constituent element may be executed by one hardware unit, or may be executed by a plurality of hardware units. The process by each constituent element shown in FIG. 5 may be executed by using one program, or may be executed by using a plurality of programs.

5. Configurations Supported by the Embodiment

The embodiment is a specific example of the following configurations.

(Configuration 1) A battery management system including: a battery capacity division section that makes a battery mounted on a mobile object available to a first user within a first area and makes the battery available to a second user other than the first user within a second area, by virtually dividing a capacity of the battery into the first area and the second area, and allocating the first area to the first user and allocating the second area to the second user, the first user being a user of the mobile object; a communication unit that performs communication with a communication terminal; a desired use condition recognition section that receives, via the communication unit, desired use condition information presenting a desired condition for use of the battery within the second area and recognizes the desired condition for use, the desired use condition information being transmitted from a prospective user terminal used by a prospective user of the battery who desires to use the battery within the second area; and a battery user selection section that, when the desired condition for use recognized by the desired use condition recognition section satisfies a predetermined condition for selection, selects, as the second user, the prospective user of the battery presenting the desired condition for use that satisfies the condition for selection.

According to the battery management system in configuration 1, the battery user selection section selects the second user to which the capacity of the second area of the battery is allocated, whereby it is possible to support more effective use of the battery mounted on the mobile object.

(Configuration 2) The battery management system according to configuration 1, wherein a condition that the desired condition for use includes payment of a consideration of a predetermined amount or more for use of the battery within the second area is set as the condition for selection.

According to the battery management system in configuration 2, a prospective user that pays a high consideration can be selected as the second user.

(Configuration 3) The battery management system according to configuration 1 or 2, wherein a condition that when the desired use condition recognition section recognizes a plurality of the desired conditions for use that include an amount of a consideration to be paid for use of the battery within the second area, the desired condition for use includes the highest amount to be paid is set as the condition for selection.

According to the battery management system in configuration 3, a prospective user offering to pay the highest consideration can be selected as the second user from among the plurality of prospective users.

(Configuration 4) The battery management system according to any one of configurations 1 to 3, wherein a condition that the desired condition for use includes a desired period of use of the battery within the second area, the desired period of use being a first predetermined period or more, is set as the condition for selection.

According to the battery management system in configuration 4, a prospective user that has a long desired period of use can be selected as the second user.

(Configuration 5) The battery management system according to any one of configurations 1 to 4, wherein a condition that when the desired use condition recognition section recognizes a plurality of the desired conditions for use that include a desired period of use of the battery within the second area, the desired condition for use includes the longest desired period of use is set as the condition for selection.

According to the battery management system in configuration 5, a prospective user offering the longest desired period of use can be selected as the second user from among the plurality of prospective users.

(Configuration 6) The battery management system according to any one of configurations 1 to 5, wherein a condition that after use of the mobile object by the first user is started, when the desired use condition recognition section recognizes the desired condition for use presenting a desired capacity of the second area that necessitates a decrease in the capacity of the first area, the battery user selection section transmits, via the communication unit, capacity decrease confirmation information to a first user terminal used by the first user and receives, via the communication unit, capacity decrease approval information transmitted from the first user terminal in response to reception of the capacity decrease confirmation information is set as the condition for selection, the capacity decrease confirmation information inquiring whether or not to approve of a decrease in the capacity of the first area, the capacity decrease approval information indicating approval of the decrease in the capacity of the first area.

According to the battery management system in configuration 6, when a condition for use that necessitates a decrease in the capacity of the first area is presented by a prospective user, the prospective user can be selected as the second user on condition of approval by the first user.

(Configuration 7) The battery management system according to any one of configurations 1 to 6, including a selection condition relaxation section that relaxes the condition for selection when the desired condition for use that satisfies the condition for selection is not recognized by the desired use condition recognition section.

According to the battery management system in configuration 7, by relaxing the condition for selection, it is possible to restrain a situation where the second user is not selected from continuing.

(Configuration 8) A battery management method that is executed by a computer having a communication unit that performs communication with a communication terminal, the battery management method including: a battery capacity division step of making a battery mounted on a mobile object available to a first user within a first area and making the battery available to a second user other than the first user within a second area, by virtually dividing a capacity of the battery into the first area and the second area, and by allocating the first area to the first user and allocating the second area to the second user, the first user being a user of the mobile object; a desired use condition recognition step of receiving, via the communication unit, desired use condition information presenting a desired condition for use of the battery within the second area, and recognizing the desired condition for use, the desired use condition information being transmitted from a prospective user terminal used by a prospective user of the battery who desires to use the battery within the second area; and a battery user selection step of, when the desired condition for use recognized in the desired use condition recognition step satisfies a predetermined condition for selection, selecting, as the second user, the prospective user of the battery presenting the desired condition for use.

By executing the battery management method in configuration 8 using the computer, it is possible to obtain similar operations and effects to those of the battery management system in configuration 1.

REFERENCE SIGNS LIST

1 battery management system, 10 processor, 11 battery capacity division section, 12 desired use condition recognition section, 13 battery user selection section, 14 selection condition relaxation section, 30 memory, 31 control program, 32 battery management data, 33 selection condition data, 34 electricity provider data, 40 communication unit, 50 property, 51 charge-discharge equipment, 52 charge-discharge cable, 60 vehicle (mobile object), 61 vehicle control device, 62 battery, 63 vehicle display unit, 70 communication terminal (first user terminal), 100 electricity grid, 200 (200*a* to 200*c*) electricity generation facility, 201 (201*a* to 201*c*) solar panel, 210 (210*a* to 210*c*) management system of electricity provider (prospective user terminal), 300 communication network, U1 vehicle user (first user), U2 (U2*a* to U2*c*) electricity provider (prospective user, second user), C1 first area, C2 second area

The invention claimed is:

1. A battery management system comprising a processor, wherein the processor:

performs communication, via a communication network, with a vehicle control device, a charge-discharge equipment, a communication terminal used by a vehicle user, and a management system of each of a plurality of electricity providers; and virtually divides a capacity of a battery, which is mounted on a vehicle and which is charged with electricity supplied from the charge-discharge equipment and which supplies electricity to the charge-discharge equipment, via a charge-discharge cable, into a first capacity and a second capacity, and makes the battery available to the vehicle within the first capacity and makes the battery available to the electricity provider within the second capacity by allocating the first capacity for discharge or regenerative charge accompanying electricity consumption by the vehicle, and charging from the charge-discharge equipment based on an operation by the user, and allocating the second capacity for charge as a buffer against electricity generated by an electricity generation facility connected to the charge-discharge equipment via an electricity grid, and discharge to supply electricity to the electricity grid, wherein:

the processor receives, via the communication network, desired use condition information presenting a desired condition for use of the battery within the second capacity and recognizes the desired condition for use, the desired use condition information being transmitted from the plurality of electricity providers who desire to use the battery within the second capacity, and when the desired condition for use recognized satisfies a predetermined condition for selection, allows the electricity provider that presents the desired condition for use that satisfies the condition for selection to use the battery at the second capacity, wherein the processor further determines an allocation ratio between the first capacity and the second capacity of the vehicle battery according to the desired condition for use of the selected electricity provider, and makes the vehicle control device perform charge-discharge control based on the allocation ratio, and wherein the processor relaxes the predetermined condition for selection when the desired condition for use that satisfies the predetermined condition for selection is not recognized, transmits selection condition change information notifying of a relaxed condition for selection to the management system of each of the plurality of electricity providers, and repeats further relaxing the condition for selection when the desired condition for use that satisfies the relaxed condition for selection is not recognized for a predetermined time period after transmitting the selection condition change information.

2. The battery management system according to claim 1, wherein a condition that after use of the vehicle by the vehicle user is started, when the processor recognizes the desired condition for use presenting a desired capacity of the second capacity that necessitates a decrease in the capacity of the first capacity, the processor transmits capacity decrease confirmation information to the communication terminal used by the vehicle user and receives capacity decrease approval information transmitted from the communication terminal in response to reception of the capacity decrease confirmation information is set as a fifth condition for selection, the capacity decrease confirmation information inquiring whether or not to approve of a decrease in the capacity of the first capacity, the capacity decrease approval information indicating approval of the decrease in the capacity of the first capacity.

3. A battery management method that is executed by a computer that performs communication, via a communication network, with a vehicle control device, a charge-discharge equipment, a communication terminal used by a vehicle user, and a management system of each of a plurality of electricity providers, the battery management method comprising:

a battery capacity division step virtually dividing a capacity of a battery, which is mounted on vehicle and which is charged with electricity supplied from the charge-discharge equipment and supplies electricity to the charge-discharge equipment, via the charge-discharge cable, into a first capacity and a second capacity, making the battery available to vehicle within the first capacity and making the battery available to the electricity provider within a the second capacity by allocating the first capacity for discharge or regenerative charge accompanying electricity consumption by the vehicle, and charging from the charge-discharge equipment based on an operation by the user, and allocating the second capacity for charge as a buffer against electricity generated by an electricity generation facility connected to the charge discharge equipment via an electricity grid, and discharging to supply electricity to the electricity grid;

a desired use condition recognition step of receiving, via the communication network, desired use condition information presenting a desired condition for use of the battery within the second capacity, and recognizing the desired condition for use, the desired use condition information being transmitted from the plurality of electricity providers who desire to use the battery within the second capacity;

a battery user selection step of, when the desired condition for use recognized in the desired use condition recognition step satisfies a predetermined condition for selection, allowing the electricity provider that presents the desired condition for use that satisfies the condition for selection to use the battery at the second capacity; and a ratio allocation step of determining an allocation ratio between the first capacity and the second capacity of the vehicle battery according to the desired condition for use of the selected electricity provider, and making the vehicle control device perform charge-discharge control based on the allocation ratio, wherein, in the desired use condition recognition step, relaxing the predetermined condition for selection when the desired condition for use that satisfies the condition for selection is not recognized, transmitting selection condition change information notifying of a relaxed condition for selection to the management system of each of the plurality of electricity providers, and repeating further relaxing the condition for selection when the desired condition for use that satisfies the relaxed condition for selection is not recognized for a predetermined time period after transmitting the selection condition change information.

* * * * *